United States Patent [19]

Cavalli et al.

[11] Patent Number: 4,983,557
[45] Date of Patent: Jan. 8, 1991

[54] PROCESS FOR PREPARING A HIGH-DENSITY AND MIDDLE-POROSITY CATALYST, SUPPORTED ON A SILICEOUS MATRIX, BASED ON VANADIUM

[75] Inventors: Luigi Cavalli, Novara; Renzo Nardini, Vercelli, both of Italy

[73] Assignee: Ausimont, S.r.l., Italy

[21] Appl. No.: 297,345

[22] Filed: Jan. 17, 1989

[30] Foreign Application Priority Data

Jan. 18, 1988 [IT] Italy ................. 19097 A/88

[51] Int. Cl.$^5$ ............. B01J 23/92; B01J 21/20; B01J 23/22; C01B 17/74
[52] U.S. Cl. ................. 502/26; 423/535; 502/21; 502/25; 502/34; 502/243; 502/247; 502/527
[58] Field of Search ........... 502/243, 247, 84, 20–26; 423/535

[56] References Cited

U.S. PATENT DOCUMENTS

| | | | |
|---|---|---|---|
| 1,880,678 | 10/1932 | Beardsley et al. | 502/243 |
| 2,029,376 | 2/1936 | Joseph | 423/535 |
| 3,186,794 | 6/1965 | Davies | 423/535 |
| 4,155,875 | 5/1979 | Yamaguchi et al. | 502/26 |
| 4,284,530 | 8/1981 | Sherif | 423/535 |
| 4,410,450 | 10/1983 | Sasaki et al. | 502/215 |
| 4,485,190 | 11/1984 | Sherif | 502/243 |

FOREIGN PATENT DOCUMENTS 0151823 8/1985 European Pat. Off. .

OTHER PUBLICATIONS

Ind. Eng. Chem. Prod. Dev., 1981, 20, 439–450, Neimark et al., "Theory of Preparation of Supported Catalysts".
Journal of Catalysis, vol. 43, 1976, pp. 243–251; Academic Press, Inc. Duluth, MN; S. A. Hassan, et al. "Catalytic and Surface Characteristics of Newly Imported, Exhausted, and Regenerated V2O5 Catalysts Used in H2S04 Manufacturing".

Primary Examiner—Paul E. Konopka
Attorney, Agent, or Firm—Morgan & Finnegan

[57] ABSTRACT

A process for preparing a high-density and, low-silica catalyst, supported on a siliceous matrix, based on vanadium, oxygen and alkali metals, wherein the $V_2O_5$ content ranges from 6 to 9% by weight, the $K_2O$ content ranges from 8.5 to 12% by weight and the particle density ranges from 0.90 to 1.40 g/cm$^3$ and wherein furthermore:

the volume of the pores is from 0.30 to 0.70 cm$^3$/g and the surface area is from 0.30 to 3 m$^2$/g, the average radius of the pores being from 650 to 2200 nanometers;

the $SiO_2$ content is equal to or lower than 75% by weight and the $Fe_2O_3$ content is equal to or greater than 0.90% by weight.

16 Claims, No Drawings

PROCESS FOR PREPARING A HIGH-DENSITY AND MIDDLE-POROSITY CATALYST, SUPPORTED ON A SILICEOUS MATRIX, BASED ON VANADIUM

BACKGROUND OF THE INVENTION

Vanadium-based catalysts, carried on a siliceous substrate, are usually utilized to oxidize sulphur dioxide to sulphur trioxide; see, for example, British Pat. Nos. 808,639; 898,985; 972,402 and 1,520,336, U.S. Pat. Nos. 3,448,061 and 4,485,190 and European Pat. Nos. 47,540 and 151,823, the content of which is an integral part of the present description. As a siliceous matrix there were used so far a fossil meal (diatomaceous earth) and finely particled silica gel, but it is possible to obtain good results also by using alpha quartz (cristobalite), silicalites, vanadium silicalites or titanium silicalites. For the meaning of these terms, reference should be made to Italian Pat. application No. 22,220 A/87 and to British Pat. No. 2,024,790. These catalysts can be approximately represented by rough formula (I):

$$V_x K_y Na_z O_w S_t \qquad (I)$$

where x, y, w, z and t are broadly varying indexes (depending on the operative conditions and on the ageing degree) and where z can be also equal to zero. Iron (Fe) and other elements (Cs, Al, Mn, Mg etc.) are present too. Still further elements (As, Cl, F, Se etc.), although in very small amounts, are surely poisons for this catalysis. The catalyst, utilizable in both fixed beds and fluid beds, exhibits amounts of vanadyl-alkaline sulphates and pyrosulphates, the concentration of which varies as a function of time. The yields obtainable with these catalysts are high, mainly if use is made of a series of several catalytic layers (at least 3 or 4), of the axial or radial type. Usually, the catalyst is prepared by impregnating a fossil meal or a different siliceous support (average diameter=about 1-40 micrometers), with an aqueous solution of NaOH and of potassium metavanadate ($KVO_3$) and/or of ammonium metavanadate ($NH_4VO_3$), whereafter the meal is thickened, for example by means of carboxy-methylcellulose or a polyacrylamide. There follows an extrusion, whereby differently shaped particles (solid, hollow or polylobed cylinders, optionally having helical grooves, etc.) are formed. Prior to use, the catalyst is activated in a $SO_2$ flow and a final activation is operated by the same process fluid, containing $SO_2$, $SO_3$, $O_2$ and $N_2$, at the reaction temperature (350°-650° C.) During the oxidation of $SO_2$ to $SO_3$ the activated catalyst material is in the form of a liquid film on the support pores surfaces. The average life of these catalysts ranges from 5 to 10 years with a progressive decrease of the vanadium content (for example from about 7% to about 5% by weight). The possibility of regenerating and re-using the exhausted catalyst would represent an advantage of great industrial importance. However, it was not possible so far to carry into effect any of the various supposed alternatives.

According to a first alternative [see Journal of Catalysis 43, 243-251 (1976)], the exhausted catalyst should be attacked by a strong acid (HCl), capable of solubilizing the vanadium, and the same vanadium should be recovered by extraction. This method, however, was not practised due to the presence of an insoluble siliceous gangue which effectively retains a not negligible vanadium amount. The difficulties encountered in the separation of the gangue could not be overcome so far, at least from an industrial viewpoint.

A second alternative (see again said article in Journal of Catalysis) comprises heating the exhausted supported catalyst to very high temperatures (500° C.), in order to remove arsenic and the other poisons, and a subsequent grinding of the calcination residue. It is then necessary to knead the ground residue with sulphur and with an ammonium sulphate solution, whereafter an activation with air at 750°-800° C. is carried out. Neither this method, however, is free from drawbacks. Compression strength, ageing resistance and abrasion resistance are not fully satisfactory. Furthermore, the $SO_2$ conversion yields often sink to not acceptable values.

A third alternative, at last, contemplates a possible recovery from an exhausted catalyst having a silica ($SiO_2$) content higher than 80% by weight. In this case, however, as a consequence of a too long exploitation of the catalyst, a non-negligible amount of the catalytic activity gets irremediably lost.

The Applicant has now found that it is possible to prepare an excellent catalyst (free from said drawbacks), in an utmost rapid and simple manner, by starting from an already exploited and now exhausted catalyst.

DISCLOSURE OF THE INVENTION

In its broadest aspect, the invention relates to a process for preparing a high-density and middle-porosity catalyst, supported on a siliceous matrix, based on vanadium, oxygen and alkali metals, in which the $V_2O_5$ content ranges from 6 to 9% by weight, the $K_2O$ content ranges from 8.5 to 12% by weight and the particle density (see ASTM-D-3766-83a standards) ranges from 0.90 to 1.40 g/cm$^3$, and in which, furthermore:

- the volume of the pores ranges from 0.30 to 0.70 cm$^3$/g and the surface area ranges from 0.30 to 3 m$^2$/g, the average radius of the pores being from 650 to 2200 nanometers;
- the $SiO_2$ content is equal to or lower than 75% and preferably less than 60% by weight and the $Fe_2O_3$ content is equal to or greater than 0.90% by weight.

The presence of a relatively high iron content proves the origin from exhausted catalysts (which are utilized as a raw material), in which iron accumulates (coming in from the corrosion of the apparatuses). To calculate the average radius of the pores, the formula $R=2V/S\times 1000$ (nanometers) is used, wherein V is the volume of the pores (cm$^3$/g) and S is the surface area of the pores (m$^2$/g).

This catalyst is prepared, according to the process of the present invention, in a very rapid and simple manner, by grinding an exhausted catalyst of the same type, having a silica ($SiO_2$) content equal to or lower than 75% and preferably less than 60% by weight (coming from an already existing plant for the oxidation of sulphur dioxide to sulphur trioxide), until the average diameter of the particles is in the range of from 1 to 50 (preferably from 5 to 40) micrometers and by adding an impregnating water solution, containing a compensative amount of those catalytic elements, the lack of which had rendered the previously employed catalyst no longer utilizable (exhausted). Before adding the solution it is possible to mix the ground material with little amounts of fresh fossil meal, up to a maximum of 60% and preferably of 50% by weight, referred to the whole catalyst. As an alternative to the fossil meal it is possible to use silicalites, titanium silicalites, vanadium silicalites or alpha-quartz, provided, of course, the final $SiO_2$ content in the catalyst does not exceed 75% and preferably 60% by weight. Excellent results have been obtained by adding said solution according to the "dry" impregnation technology, which is described for example in Ind. Eng. Chem. Prod. Res. Dev.; vol. 20 p. 441 (1981). Reference should be made also to European Pat. Nos. 47,540 and 151,823. As an alternative, the solution can be added prior to and/or during grinding, according to a technology which is known as "co-mulling" (U.S. Pat. Nos. 4,444,742 and 4,444,908).

The catalysts prepared by the Applicant according to the new process lead to an unexpected result. In fact, after a normal activation (first with $SO_2$, then with the process gases), they substantially exhibit—weight and temperature being equal—the catalytic activity of a fresh catalyst. That permits to charge into the reactors much higher (even +20% by-weight) amounts of catalyst in comparison with the run with a fresh catalyst, thereby obtaining higher conversions without increasing at all the volume and/or varying the geometry of the reactors.

The invention can be practiced by following various modalities. As vanadium water-soluble compounds it is possible to use, for example, potassium metavanadate, sodium metavanadate, ammonium metavanadate or vanadium anhydride ($V_2O_5$); furthermore:

- as water-soluble compounds of potassium or of sodium it is possible to use potassium or sodium hydrate, oxalate, oxide, carbonate, bicarbonate, sulphate, bisulphate or metavanadate;
- as an alkali metal, also caesium (besides K and Na) can be present;
- besides the basic elements (V, K, Na, 0, Fe) also titanium can be present;
- thickening (by means of carboxymethyl-cellulose or polyacrylamide) can be carried out in one or more steps and can be preceded by an additioning with a pore-forming agent, selected for example from starch and the ammonium phoshates (in particular diammonium phosphate), and optionally also with $H_2O$;
- the catalyst can be shaped in the form of solid, hollow or polylobed cylinders, optionally with helical grooves, the shaping being followed by drying and by an activating calcination, in the presence of $SO_2$, at a temperature generally ranging from 270° to 600° C.

EXAMPLES

The following examples are given to illustrate the present invention, without limiting however the scope thereof.

EXAMPLE 1 (FRESH CATALYST: BASIC EXAMPLE)

This example describes the usual preparation of a catalyst by using, as a raw material, fresh fossil meal. To 1 kg of a fossil meal, having a $SiO_2$ content equal to 87.13% by weight and put on the market by DIATOM Co. under the trade-name Diatom 135C, there were added, under stirring, in a sigmablade kneading machine, 0.433 liters of a potassium vanadate solution (titre=280 g/liter of $V_2O_5$); after 15 minutes there were added 0.17 liters of concentrated sulphuric acid (density=1.54 g/cm³). Stirring was continued for further 15 minutes, whereafter, to the so-obtained paste 126 g of carboxymethylcellulose (CMC) in powder and 930 g of an aqueous solution of CMC at 3% by weight were added. The paste was extruded through a piston extruder, so obtaining (solid) cylinders having a diameter of 4 mm and a height of 5-6 mm. The so-obtained product was dried at 120° C. for 12 hours and then it was activated at 450° C. for 1 hour whilst simultaneously conveying a $SO_2$ flow at 270° C. The so-prepared catalyst exhibited the following composition by weight:

| | |
|---|---|
| $V_2O_5$ = 7.84% | $SO_3$ = 20.85% |
| $K_2O$ = 10.95% | $Na_2O$ = 1.37% |
| $SiO_2$ = lower than 59% | | and the following physical properties:

| | |
|---|---|
| surface area = 1.05 m²/g | particle density = 0.86 g/cm³ |
| actual density = 2.41 g/cm³ | pore volume = 0.784 cm³/g. |

EXAMPLE 2 (REGENERATED HIGH-DENSITY CATALYST)

This example describes the method of preparing a catalyst by impregnating a pre-existent, by now exhausted catalyst with a potassium metavanadate solution, in such amount as to bring the concentration values of vanadium and of potassium to the levels of a fresh catalyst. The exhausted starting catalyst, sampled after discharge from an industrial converter, exhibited the following composition by weight:

| | |
|---|---|
| $V_2O_5$ = 7.00% | $SO_3$ = 21.24% |
| $K_2O$ = 9.50% $Na_2O$ = 0.93% | |
| $SiO_2$ = lower than 60% | | and the following physical properties:

| | |
|---|---|
| surface area = 1.66 m²/g | particle density = 1.08 g/cm³ |
| actual density = 2.40 g/cm³ | volume of pores = 0.51 cm³/g |

1 kg of said exhausted catalyst was ground to obtain a powder (with a marked tendency to caking), with an average diameter of the particles lower than 50 micrometers. To the so-obtained powder there were added, under stirring, in a kneading machine, 75 g of a potassium vanadate solution (titer=305.8 g/liter of $V_2O_5$; density=1.55 g/liter), diluted to 150 cm³ with $H_2O$. Stirring was carried on for 15 minutes, whereafter 30 g of a thickening agent based on polyacrylamide, marketed by MONTEFLUOS Co. under the trade-name Ecoclar 8008 (as a powder) and 480 g of an aqueous solution of said Ecoclar 8008 (concentration=15 g/liter) were added. The resulting product was then extruded, dried and activated according to the modalities of example 1. The so-obtained catalyst exhibited the following by weight composition:

| | |
|---|---|
| $V_2O_5$ = 7.88% | $SO_3$ = 22.93% |
| $K_2O$ = 10.80% | $SiO_2$ = about 56% |
| $Na_2O$ = 0.90% | $Fe_2O_3$ = 1.45% | and the following physical properties:

| | |
|---|---|
| surface area = 0.76 m²/g | particle density = 1.31 g/cm³ |
| actual density = 2.41 g/cm³ | pore volume = 0.304 cm³/g |

-continued average radius of the pores = 800 nanometers

For the activity tests, a laboratory cylindrical reactor (immersed in a thermostatic bath of molten salts), having an inside diameter of 42 mm and a height of 450 mm, equipped with a coaxial thermocouple, was used. Into the reactor there were charged 80 g of a regenerated catalyst (115 cm$^3$) distributed in 10 layers of 8 g each with 11 interposed layers of an inert material (calcined Al$_2$O$_3$) having a height of about 3 cm each, in order to have a substantially isothermal trend of the reaction. Before being charged into the reactor, the catalyst was subjected to an activating grinding, which provided particles having an average size from 0.1 to 1 mm. The diffusion effects were practically eliminated by this grinding. Data and results are indicated in Table 1.

EXAMPLE 3

Example 2 was repeated, bringing to 120 g (140 cm$^3$) the amount of catalyst charged into the reactor. Data and results are indicated in Table 1.

EXAMPLE 4 (COMPARATIVE TEST)

Example 2 was repeated, charging into the reactor 80 g of non-regenerated exhausted catalyst. Data and (unsatisfactory) results are reported on Table 1.

EXAMPLE 5 (COMPARATIVE TEST)

This example describes a method of preparing a catalyst obtained by subjecting the exhausted catalyst to a heat treatment according to the article of the Journal of Catalysis (1976) cited in the specification hereof. Said heat treatment had the purpose of concentrating vanadium and potassium, bringing again the values of these elements to the values of the fresh catalyst.

A sample of exhausted catalyst, sampled after discharge from an industrial converter, exhibited the following by weight composition:

| | |
|---|---|
| V$_2$O$_5$ = 7.11% | SO$_3$ = 17.05% |
| K$_2$O = 10.20% | Na$_2$O = 1.16% |
| SiO$_2$ = about 65% | | and the following physical properties:

| | |
|---|---|
| surface area = 3.03 m$^2$/g | particle density = 0.62 g/cm$^3$ |
| actual density = 2.41 g/cm$^3$ | pore volume = 1.20 cm$^3$/g |

The sample was heated in a muffle furnace at 530° C. and maintained at this temperature during 24 hours, thus obtaining a concentration of the active elements. The loss, at 100° C., was 0.84% by weight (and 7.58% by weight at 530° C.). After calcining, the sample was analyzed and the following values were found:

| |
|---|
| V$_2$O$_5$ = 7.96% by weight |
| SO$_3$ = 8.94% by weight |

To a 1 kg sample of exhausted catalyst so treated at 530° C., 1 g of Ecoclar 8008 and 600 g of a solution (15 g/liter) of Ecoclar 8008 were added. The whole was mixed under stirring, extruded and then dried and activated following the modalities of example 1. The catalytic test, conducted according to the modalities of example 2, provided the results recorded on Table 1 along with the characteristics of the final catalyst. As is apparent from Table 1, the method dating back to 1976 leads to a catalyst having too small pores and exhibiting less satisfactory performances in comparison with the catalyst of the invention.

EXAMPLE 6

To a mixture of 0.5 kg of fossil meal (marketed by CLARCEL Co. under the trade-name CLARCEL Sl) and of 0.5 kg of an exhausted catalyst containing:

| |
|---|
| V$_2$O$_5$ = 5.5% by weight |
| K$_2$O = 7.2% by weight | there were added 67.75 g of NH$_4$VO$_3$ and 253.9 g of KHSO$_4$. After dry mixing of all the components, 50 g of (NH$_4$)$_2$HPO$_4$ (as a pore-forming agent) and 50 cm$^3$ of deionized H$_2$O were additioned. After a 10-minute mixing, 5 g of a polyacrylamide marketed by MONTEFLUOS Co. under the trade-name Ecoclar 8008 (as a powder) and 266 g of a different type of polyacrylamide (Ecoclar 8042), as extrusion coadjuvants, were added. The product was then extruded in the form of hollow cylinders having a diameter of 4 mm, the whole was dried at 120° C. for 12 hours. When it was activated at 600° C., gradually raising the temperature. The resulting product exhibited the following by weight composition:

| | |
|---|---|
| V$_2$O$_5$ = 6.8% | SO$_3$ = 15.76% |
| K$_2$O = 8.95% | SiO$_2$ = lower than 67% |
| Na$_2$O = 1.19% | Fe$_2$O$_3$ = 0.97% | and the following physical properties:

| | |
|---|---|
| surface area = 1.70 m$^2$/g | particle density = 0.93 g/cm$^3$ |
| actual density = 2.40 g/cm$^3$ | pore volume = 0.66 cm$^3$/g |
| average radius of the pores = 776 nanometers | |

The activity test, conducted according to the modalities of example 2, gave the results indicated in Table 1.

EXAMPLE 7

Example 3 was repeated and starch was added as a pore-forming agent during the preparation of the catalyst. Obtained was a catalyst having the following physical properties:

| | |
|---|---|
| surface area = 0.42 m$^2$/g | particle density = 1.15 g/cm$^3$ |
| average radius of the pores = 2190 nm | |
| volume of the pores = 0.46 cm$^3$/g | |

The oxidation yields of this catalyst were similar to the yields obtained according to the test of example 3.

TABLE

| Example | 2 | 3(*) | 4() | 5(**) | 6 |
|---|---|---|---|---|---|
| Starting V$_2$O$_5$ (*) (%) | 7.00 | See ex. 2 | 7.00 | 7.11 | 5.50 |
| Starting K$_2$O | 9.50 | See ex. 2 | 9.50 | 10.20 | 7.20 |
| Starting SO$_3$ | 21.24 | See ex. 2 | 21.24 | 17.05 | n.d. |
| Starting Na$_2$O | 0.93 | See ex. 2 | 0.03 | 1.16 | n.d. |
| Starting SiO$_2$ | <60 | See ex. 2 | <60 | ca.65 | n.d. |
| Part. density (g/cm$^3$) | 1.31 | 1.31 | 1.08 | 1.45 | 0.93 |
| Pore volume (cm$^3$/g) | 0.304 | 0.304 | 0.510 | 0.280 | 0.660 |
| Pore radius (nm) | 800 | 800 | 614.5 | 448 | 776 |

TABLE-continued

| Example | 2 | 3(*) | 4() | 5(**) | 6 |
|---|---|---|---|---|---|
| Area (m²/g) | 0.76 | 0.76 | 1.66 | 1.25 | 1.70 |
| Final $SiO_2$ (%) | ca.56 | ca.56 | <60 | ca.64 | <67 |
| Final $Fe_2O_3$ (%) | 1.45 | See ex. 2 | 1.43 | 1.46 | 0.97 |
| Final $V_2O_5$ (%) | 7.88 | See ex. 2 | 7.00 | 7.96 | 6.80 |
| Final $K_2O$ (%) | 10.80 | See ex. 2 | 9.50 | n.d. | 8.95 |
| Final $SO_3$ (%) | 22.93 | See ex. 2 | 21.24 | 8.94 | 15.76 |
| Final $Na_2O$ (%) | 0.90 | See ex. 2 | 0.93 | n.d. | 1.19 |
| Amount (grams) | 80 | 120 | 80 | 80 | 80 |
| Amount (cm³) | 115 | 140 | 140 | 150 | 140 |
| Conditions employed in the $SO_2$ oxidation | | | | | |
| Total gas flow (N liters/hour) | | | | | |
| $SO_2$ (% by volume) | 6% | 6% | 6% | 6% | 6% |
| $O_2$ (% by volume) | 10% | 10% | 10% | 10% | 10% |
| $SO_3$ yield (% by moles) | | | | | |
| at 450° C. | 30.8 | 29.2 | 16.10 | 1.35 | 23.17 |
| at 480° C. | 62.7 | 78.0 | 41.30 | 41.40 | 72.84 |
| at 520° C. | 76.6 | 86.7 | 66.11 | 71.25 | 84.17 |

(*)In the exhausted catalyst.
(**)Comparative test.
(***)By activating with a process fluid, in a commercial-scale plant, the yields exceeded 99%, as for the fresh catalysts.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A process for the preparation of a high density regenerated silica catalyst for the oxidation of sulphur dioxide to sulphur trioxide, supported on a siliceous matrix, comprising vanadium, iron, oxygen and potassium, wherein the $V_2O_5$ content ranges from 6 to 9% by weight, wherein the $K_2O$ content ranges from 8.5 to 12% by weight, wherein the particle density ranges from 0.90 to 1.40 g/cm and wherein:

the pore volume ranges from 0.20 to 0.70 cm³/g and the surface area ranges from 0.30 to 3 m/g, the average radius of the pores being from 600 to 2,200 nanometers;

the silica ($SiO_2$) content is equal to or lower than 75% by weight and the $Fe_2O_3$ content is from 0.90% to 1.45% by weight; characterized in that:

(a) an exhausted catalyst poor as to catalytic elements, having a silica content lower than 75% by weight and a $Fe_2O_3$ content equal to or greater than 0.90% by weight, is ground until the average diameter of the particles is from 1 to 50 micrometers;

(b) the finely ground product, coming from step (a), is mixed with added siliceous material, the resulting mixture being then impregnated with an aqueous solution containing catalytic elements which replace those of the exhausted catalyst;

(c) the impregnated catalyst from step (b) is shaped, dried and calcined at temperatures from 270° C. to 600° C., in the presence of a reducing atmosphere comprising $SO_2$.

2. The process of claim 1, wherein the $SiO_2$ content in the exhausted catalyst and in the final catalyst is equal to or lower than 60% by weight.

3. The process of claim 1, wherein impregnation is carried out according to conventional dry impregnation technology.

4. The process of claim 1, wherein said siliceous material is fresh diatomaceous earth, in an amount up to 60% by weight, on the overall weight of the catalyst.

5. The process of claim 4, wherein said diatomaceous earth is replaced by silicalites.

6. The process of claim 4, wherein the impregnation is followed by adding a carboxymethyl cellulose and/or of a polyacrylamide.

7. The process of claim 6, wherein said addition is preceded by adding a pore-forming agent, selected from starch and ammonium phosphates.

8. The process of claim 7, wherein the pore-forming agent is added in admixture with water.

9. The process of claim 6, wherein said addition is followed by a shaping, by means of extrusion, in the form of solid, hollow, or poly-lobed cylindrical pellets.

10. The process of claim 4, wherein the impregnation is carried out by using an aqueous solution containing:

(a) a water-soluble vanadium compound, selected from $KVO_3$, $NaVO_3$ and $NH_4VO_3$; and (b) a water-soluble potassium compound, selected from potassium hydroxide, oxalate, carbonate, bicarbonate, sulphate, bisulphate and metavanadate.

11. The process of claim 10, wherein said solution also contains a water-soluble caesium compound and/or pore-forming agent.

12. The process of claims from 10 to 11 wherein said vanadium compound is selected from potassium metavanadate and ammonium metavanadate.

13. The process of claims from 10 to 11, wherein said potassium compound is selected from potassium metavanadate and potassium bisulphate.

14. The process of claim 9, wherein the particles have helical grooves.

15. The process of claim 1, wherein the $SiO_2$ content is between about 56% and 75% by weight.

16. The process of claim 5, wherein the silicalites include titanium-silicalites, vanadium-silicalites or alpha quartz.

* * * * *